United States Patent
Gotoh

[11] Patent Number: 5,876,113
[45] Date of Patent: Mar. 2, 1999

[54] HEAD LAMP DEVICE FOR VEHICLE

[75] Inventor: Shinichiro Gotoh, Wako, Japan

[73] Assignee: Honda Giken Kogyo Kabushiki Kaisha, Tokyo, Japan

[21] Appl. No.: 862,510

[22] Filed: May 23, 1997

[30] Foreign Application Priority Data

May 9, 1996 [JP] Japan ..................................... 8-134721

[51] Int. Cl.⁶ .............................. B60Q 1/08; B60Q 11/00
[52] U.S. Cl. ............................................ 362/466; 362/276
[58] Field of Search ....................... 315/82, 79; 340/466, 340/467; 362/464, 465, 466, 523, 269, 276, 285, 418, 802

[56] References Cited

U.S. PATENT DOCUMENTS

| | | | |
|---|---|---|---|
| 4,858,080 | 8/1989 | Oikawa | 362/466 |
| 4,870,545 | 9/1989 | Hatanaka et al. | 362/466 |
| 5,060,120 | 10/1991 | Kobayashi et al. | 362/465 |
| 5,562,336 | 10/1996 | Gotou | 362/466 |
| 5,588,733 | 12/1996 | Gotou | 362/37 |
| 5,660,454 | 8/1997 | Mori et al. | 362/466 |
| 5,787,370 | 7/1998 | Kutscher et al. | 362/465 |

FOREIGN PATENT DOCUMENTS

| | | |
|---|---|---|
| 62-77249 | 4/1987 | Japan . |
| 3-14742 | 1/1991 | Japan . |

*Primary Examiner*—Alan Cariaso
*Attorney, Agent, or Firm*—Carrier, Blackman & Associates, P.C.; Joseph P. Carrier; William D. Blackman

[57] ABSTRACT

A head lamp device for a vehicle capable of changing a lighting region in front of the vehicle in rightward and leftward directions is provided. The device comprises a head lamp, a lighting region changing mechanism for changing the lighting region of the head lamp, a right wheel speed sensor for detecting a rotational speed of a right wheel, a left wheel speed sensor for detecting a rotational speed of a left wheel, a lighting angle calculating mechanism for calculating a lighting angle of the head lamp from the right and left wheel rotational speeds detected by the right wheel speed sensor and the left wheel speed sensor respectively, and a control mechanism for controlling the lighting region changing mechanism on the basis of the lighting angle calculated by the lighting angle calculating mechanism to change the lighting region.

14 Claims, 3 Drawing Sheets

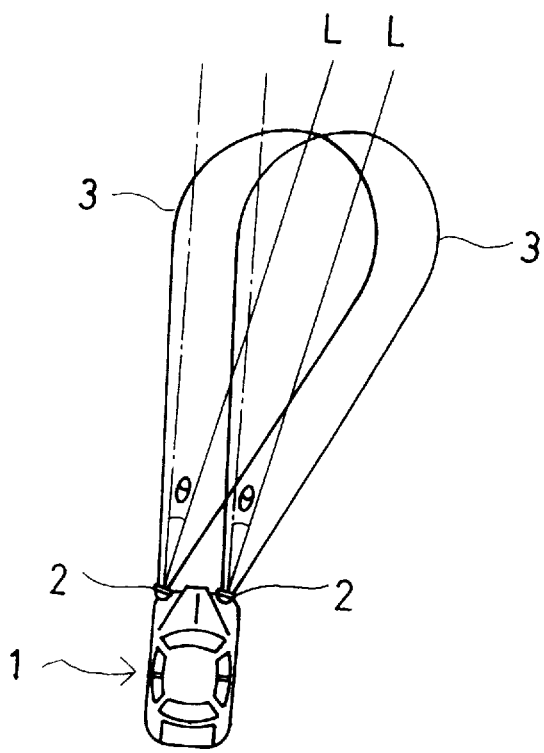
F I G . 1
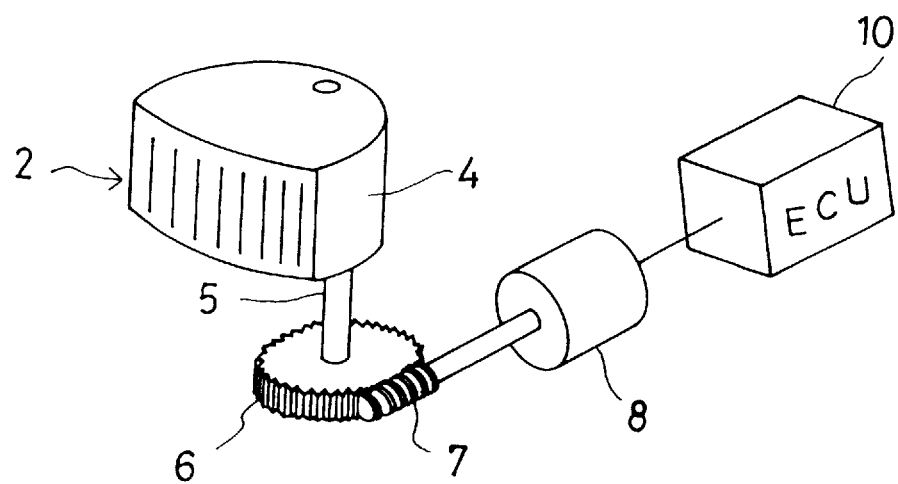
F I G . 2

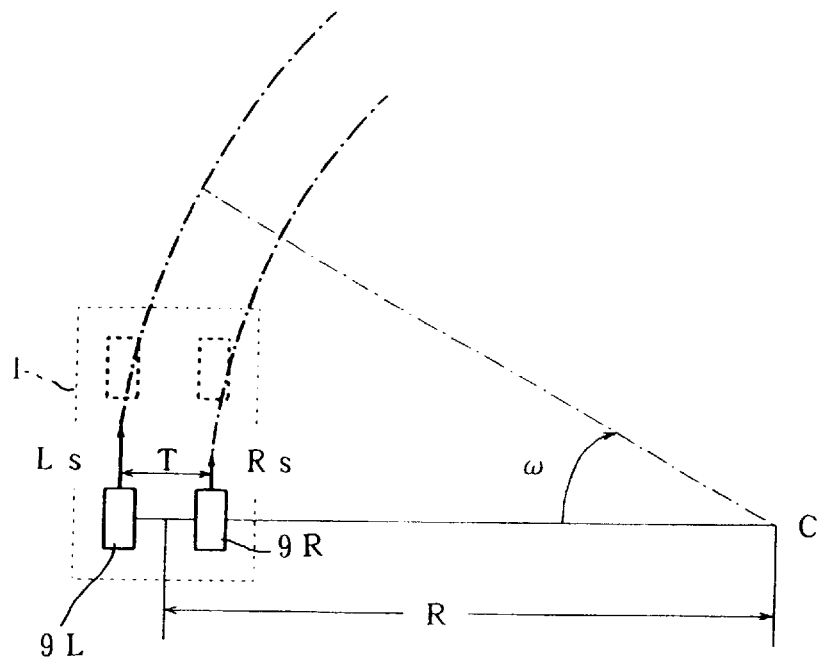
F I G. 4
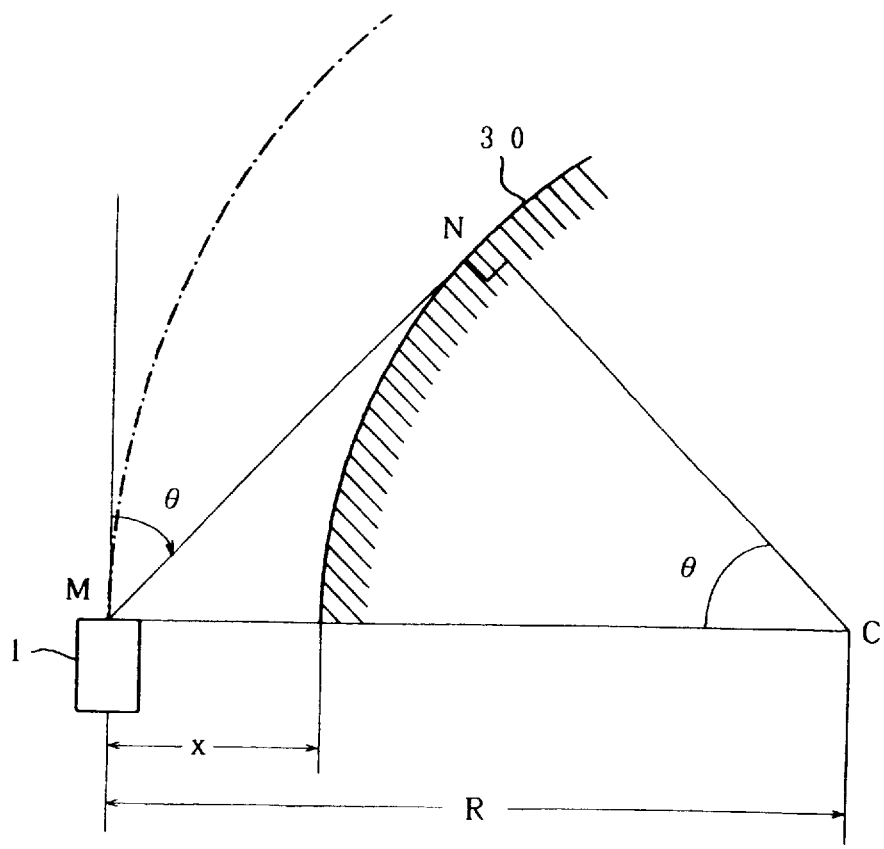
F I G. 5

HEAD LAMP DEVICE FOR VEHICLE

BACKGROUND OF THE INVENTION

1. Field of the Invention

This invention relates to light distribution control of a head lamp device for changing a lighting region in rightward and leftward directions.

2. Description of Relevant Art

Hitherto, various head lamp devices capable of changing a lighting region in rightward and leftward directions have been proposed. In almost all of them, basically the lighting region is controlled to change in response to a steering angle of the steering wheel (Japanese laid-open patent publications No. Sho 62-77249, No. Hei 3-14742 etc.) and the lighting region of the head lamp is changed to a direction of the steering to increase a lighting amount in the direction to which the vehicle is just going to advance.

Accordingly, a vehicle having such a head lamp device is specially provided with a steering angle sensor for detecting the steering angle of the steering wheel. When using the steering angle sensor, means for detecting a basis point of the steering angle is necessary in addition in order to obtain a steering angle with respect to the vehicle body.

Conventionally, a vehicle has various sensors mounted thereon, and in a vehicle installed with an anti-lock braking system (ABS), a traction control system (TCS) or the like, sensors for detecting rotational speeds of wheels are provided. Particularly, ABS tends to be installed widely in many kinds of vehicles now and in the future.

It is uneconomical that in spite of above-mentioned various sensors conventionally provided on vehicles, that the steering angle sensor and the steering angle basis point detecting means are added for changing the lighting region of a head lamp device. Thus, if a sensor used for other object can be utilized for changing the lighting region, the cost will be reduced.

SUMMARY OF THE INVENTION

The present invention has been accomplished in view of the foregoing and it is an object of the present invention to provide a head lamp device for a vehicle which utilizes wheel speed detecting means for changing a lighting region in a low cost manner.

In order to accomplish the aforesaid object, the present invention provides a head lamp device for a vehicle capable of changing a lighting region in front of the vehicle in rightward and leftward directions, comprising a head lamp; lighting region changing means for changing the lighting region of the head lamp; right wheel speed detecting means for detecting a rotational speed of a right wheel; left wheel speed detecting means for detecting a rotational speed of a left wheel; lighting angle calculating means for calculating a lighting angle of the head lamp from the right and left wheel rotational speeds detected by the right wheel speed detecting means and the left wheel speed detecting means respectively; and control means for controlling the lighting region changing means on the basis of the lighting angle calculated by the lighting angle calculating means to change the lighting region.

Since a lighting angle calculated from rotational speeds detected by right and left wheel speed detecting means is used for changing the lighting region, no special or additional detecting means is necessary for changing the lighting region so that the cost of the head lamp device can be reduced. As the wheel speed detecting means, abs or the like, which has a tendency to be a standard equipment, can be utilized.

The lighting angle calculating means may calculate a turning radius of the vehicle from the right and left wheel rotational speeds detected by the right wheel speed detecting means and the left wheel speed detecting means and calculating the lighting angle of the head lamp from the turning radius. The lighting angle of the head lamp can be calculated exactly for changing the lighting region.

Correction means for correcting the lighting angle calculated by the lighting angle calculating means may be provided. The lighting angle can be adjusted to an optimum value corresponding to a state of operation.

The correction means may correct the lighting angle by a correction amount predetermined in accordance with a vehicle speed to adjust the lighting angle to an optimum value corresponding to a state of operation.

If the vehicle speed is calculated from the wheel rotational speeds detected by the right wheel speed detecting means and the left wheel speed detecting means, it is unnecessary to also input a vehicle speed detected specially by another detecting means. If the right wheel speed detecting means and the left wheel speed detecting means are made to detect rotational speeds of right and left non-driven wheels respectively, the lighting angle of the head lamp can be calculated more exactly for changing the lighting region.

BRIEF DESCRIPTION OF THE DRAWINGS

FIG. 1 is a view showing a vehicle equipped with a head lamp device according to one preferred embodiment of the present invention as viewed from above;

FIG. 2 is a schematic perspective view showing a swinging mechanism for a head light of the preferred embodiment;

FIG. 4 is an illustration for introducing a formula for calculating turning radius R; and FIG. 5 is an illustration for introducing a formula for calculating basic angle $\theta_0$.

DETAILED DESCRIPTION OF THE PREFERRED EMBODIMENT

Figure 3:
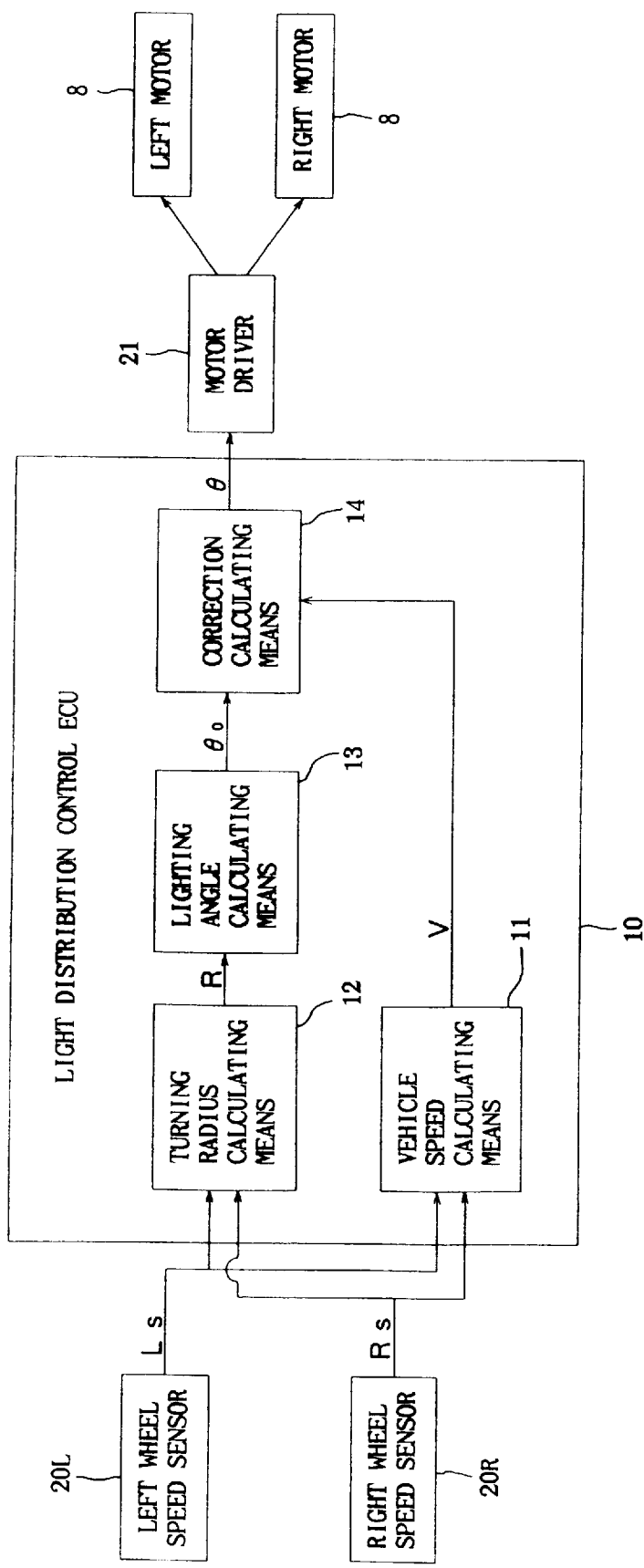
FIG. 3 is a rough block diagram showing a control system for changing a lighting region according to the preferred embodiment.

Hereinafter, a preferred embodiment of the present invention will be described with reference to FIGS. 1 to 5.

A vehicle 1 of the preferred embodiment is a FF car (Front engine-Front drive type car) and has ABS as a standard installation.

The vehicle 1 has head lights 2 for lighting the space in front of the vehicle installed such that they are swingable in rightward and leftward horizontal directions. FIG. 1 is a view for showing the vehicle 1 from above and in this figure, the right and left head lights 2, 2 are swung rightward so as to cause the right forward regions to become lighting regions 3, 3.

The right and left head lights 2, 2 are swung together in the same direction by the same angle and as shown in FIG. 1, angles of their optical axes L, L with respect to an advancing direction of the vehicle, i.e. lighting angle, are both set to be $\theta$. Regarding the angle $\theta$ that on the right side with respect to the advancing direction is viewed positive or given a plus sign and that on the left side is viewed negative or given a minus sign.

Alternatively, only a head light on the turning side may be swung or the right and left head lights may be swung by respective angles different from each other.

A swinging mechanism for swinging the head light 2 in the preferred embodiment is schematically shown in FIG. 2, wherein a lamp unit 4 of the head light 2 is fixed to a rotary shaft 5, and a worm gear 7 formed at a driving shaft of a motor 8 is engaged with a worm wheel 6 fitted to the rotary shaft 5.

Accordingly, the lamp unit 4 is swung together with the rotary shaft 5 through an engagement between the worm gear 7 and the worm wheel 6 under a driving force of the motor 8. The motor 8 is controlled for its driving by a light distribution control ECU 10.

In a vehicle having the ABS, a wheel speed sensor for always monitoring a state of a wheel to detect slip of the wheel on the road surface is provided on each wheel. The wheel speed sensor perceives a projection of a gear pulser rotating together with the wheel by means of an electromagnetic pickup coil and counts the pulses to detect a wheel rotational speed.

Among these wheel rotational speeds, right and left wheel rotational speeds Rs, Ls respectively detected by rear wheel speed sensors 20R, 20L on right and left rear wheels 9R, 9L which are non-driven wheels are inputted into the light distribution control ECU 10.

The gear pulser has 40 pieces of the projection arranged in a circle so that the electromagnetic pickup coil generates 40 pulses for one revolution of the wheel, therefore if a number P of the pulses in one second is counted, each of the wheel rotational speeds Rs, Ls can be obtained as angular velocity (rad/s) by the expression $P \times 2\pi/40$.

FIG. 3 is a rough block diagram showing a control system for changing the lighting region in the present preferred embodiment of the invention. The wheel rotational speeds Rs, Ls inputted into the light distribution control ECU 10 from the right and left rear wheel speed sensors 20R, 20L are processed by a vehicle speed calculating means 11 and a turning radius calculating means 12 in the light distribution control ECU 10 to calculate vehicle speed V and a turning radius R.

When the radius of each of the rear wheels 9R, 9L is r, moving speeds of the right rear wheel 9R and the left rear wheel 9L are r×Rs and r×Ls respectively. Therefore, the vehicle speed calculating means 11 calculates the vehicle speed V by the following formula (1) taking an average of both wheel speeds.

$$V = r(Ls + Rs)/2 \tag{1}$$

Referring to FIG. 4, provided that the space between the right and left wheels 9R, 9L is T, the turning radius is R and the vehicle turns to the right (Ls<Rs), a radius from a turning center C to the left rear wheel 9L is R+T/2 and a radius from the center C to the right rear wheel 9R is R−T/2.

Provided that the angular velocity of the turning is $\omega$, the moving speed of the left rear wheel 9L is $\omega(R+T/2)$, and that of the right rear wheel 9R is $\omega(R-T/2)$. Since these moving speeds are to be equal to the aforementioned moving speeds r×Ls, r×Rs obtained from the wheel rotational speeds Ls, Rs respectively, the following equations are established.

$$\omega(R+T/2) = r \times Ls$$

$$\omega(R-T/2) = r \times Rs$$

Since the turning angular velocity $\omega$ is common to both the left and right rear wheel 9L, 9R, $$\omega = r \times Ls/(R+T/2) = r \times Rs/(R-T/2)$$

From this formula, the following formula (2) is drawn.

$$R = \{T(Ls+Rs)\}/\{2(Ls-Rs)\} \tag{2}$$

The turning radius calculating means 12 calculates the turning radius R by this formula (2).

The calculated turning radius R is inputted to a lighting angle calculating means 13 in the light distribution control ECU 10 to be processed for calculating a basic lighting angle $\theta_0$.

Referring to FIG. 5, a curved road shoulder 30 on the right side of a right curve road is assumed to be an ideal circular arc and a distance from the vehicle 1 to the road shoulder 30 is assumed to be x.

The basic lighting angle $\theta_0$ is calculated on the assumption that a direction of a tangent drawn from the vehicle 1 to the circular-arc-shaped road shoulder 30 is a fundamental lighting direction of the head lamp.

If the turning center is denoted by C, position of the vehicle 1 by M and a contact point of the tangent and the road shoulder 30 by N, the basic lighting angle $\theta_0$ is equal to an angle of a right-angled triangle MNC at the apex C. Therefore the next formula is established.

$$\cos \theta_0 = NC/MC = (R-x)/R$$

That is, $$\theta_0 = \cos^{-1}\{(R-x)/R\} \tag{3}$$

The lighting angle calculating means 13 calculates the basic lighting angle $\theta_0$ by the formula (3).

The above basic lighting angle $\theta_0$ is inputted into a correction calculating means 14 to be corrected based on the vehicle speed V and finally a lighting angle $\theta$ is calculated. Namely, in the correction calculating means 14, the basic lighting angle $\theta_0$ is multiplied by a correction coefficient K(V) based on the vehicle speed V calculated by the vehicle speed calculating means 11 to calculate the lighting angle $\theta$ by the following formula (4).

$$\theta = K(V) \times \theta_0 \tag{4}$$

The correction coefficient K(V) is predetermined about in proportion to the vehicle speed V.

A control signal based on the lighting angle $\theta$ is outputted to a motor driver 21 which drives the motor 8 to swing the head light 2 at the lighting angle $\theta$.

The above procedure will be described with concrete numerical values as follows.

It is supposed that radius of the rear wheels 9L, 9R is 0.25 (m), the wheel distance T is 1 (m) and the pickup coils of the left and right rear wheels 9L, 9R generate 240 and 220 pulses a second, respectively. The left rear wheel rotational speed Ls is $12\pi$ (rad/s), the right rear wheel rotational speed Rs is $11\pi$ (rad/s), and the vehicle is turning to the right because Ls>Rs.

From the formula (1), the vehicle speed V is calculated as follows.

$$V = 0.25(12\pi + 11\pi)/2 = 9 (m/s) = 32 \ (Km/h)$$

From the formula (2), the turning radius R is calculated as follows.

$$R=\{1\times(12\pi+11\pi)\}/\{2\times(12\pi-11\pi)\}=11 (m)$$

When the distance x from the vehicle 1 to the road shoulder 30 is 3 (m), the basic lighting angle $\theta_0$ is calculated from the formula (3) as follows.

$$\theta_0=\cos^{-1}\{(11-3)/11\}=43 \text{ (degrees)}$$

If the correction coefficient K(V) for the vehicle speed of 32 Km/h is 0.6, the lighting angle $\theta$ is 0.6×43=25.8 degrees, accordingly the lighting direction is controlled to be directed rightward by 25.8 degrees with respect to the front of the vehicle body.

In the aforementioned embodiment, the lighting angle $\theta$ to be used for controlling change of the lighting region is calculated utilizing the right and left rear wheel speed sensors 20R, 20L for ABS installed in the vehicle 1, so that no special or additional sensor for detecting the steering angle or the like is necessary for controlling change of the lighting region, and the cost of the head lamp device can be reduced.

Since the vehicle 1 of the above embodiment is a FF car, the wheel rotational speed of the rear wheel which is a non-driven wheel is used to calculate the lighting angle $\theta$, because slippage on a road surface of a non-driven wheel is less than that of a driven wheel and the non-driven wheel shows movement of the vehicle faithfully to allow a more exact calculation of the basic lighting angle $\theta_0$. Therefore, in case of a FR car (Front-engine Rear-drive type car), a wheel rotational speed of a front wheel which is a non-driven wheel is utilized for calculating the lighting angle $\theta$.

Although there has been described what is at present considered to be the preferred embodiment of the invention, it will be understood by persons skilled in the art that variations and modifications may be made thereto without departing from the spirit or essence of the invention. The scope of the invention is, therefore, indicated by the appended claims rather than by the foregoing description of the preferred embodiment.

What is claimed is:

1. A head lamp device for a vehicle capable of changing a lighting region in front of the vehicle in rightward and leftward directions, comprising:

a head lamp;

lighting region changing means for changing the lighting region of the head lamp;

right wheel speed detecting means for detecting a rotational speed of a right wheel;

left wheel speed detecting means for detecting a rotational speed of a left wheel;

lighting angle calculating means for calculating a lighting angle of the head lamp from said right and left wheel rotational speeds detected by said right wheel speed detecting means and said left wheel speed detecting means, respectively; and control means for controlling said lighting region changing means based on said lighting angle calculated by said lighting angle calculating means to change said lighting region.

2. A head lamp device for a vehicle as claimed in claim 1, wherein said lighting angle calculating means calculates a turning radius of the vehicle from said right and left wheel rotational speeds detected by said right wheel speed detecting means and said left wheel speed detecting means, and calculates said lighting angle of the head lamp from said turning radius.

3. A head lamp device for a vehicle as claimed in claim 1, comprising correction means for correcting said lighting angle calculated by said lighting angle calculating means.

4. A head lamp device for a vehicle as claimed in claim 3, wherein said correction means corrects said lighting angle by a correction amount predetermined in accordance with a vehicle speed.

5. A head lamp device for a vehicle as claimed in claim 4, wherein said vehicle speed is also calculated from said wheel rotational speeds detected by said right wheel speed detecting means and said left wheel speed detecting means.

6. A head lamp device for a vehicle as claimed in claim 1, wherein said right wheel speed detecting means and said left wheel speed detecting means detect rotational speeds of right and left non-driven wheels respectively.

7. A head lamp device for a vehicle as claimed in claim 2, comprising correction means for correcting said lighting angle calculated by said lighting angle calculating means.

8. A head lamp device for a vehicle as claimed in claim 7, wherein said correction means corrects said lighting angle by a correction amount predetermined in accordance with vehicle speed.

9. A head lamp device for a vehicle as claimed in claim 2, wherein said right wheel speed detecting means and said left wheel speed detecting means detect rotational speeds of right and left non-driven wheels respectively.

10. A head lamp device for a vehicle as claimed in claim 3, wherein said right wheel speed detecting means and said left wheel speed detecting means detect rotational speeds of right and left non-driven wheels respectively.

11. A head lamp device for a vehicle as claimed in claim 4, wherein said right wheel speed detecting means and said left wheel speed detecting means detect rotational speeds of right and left non-driven wheels respectively.

12. A head lamp device for a vehicle as claimed in claim 5, wherein said right wheel speed detecting means and said left wheel speed detecting means detect rotational speeds of right and left non-driven wheels respectively.

13. A head lamp device for a vehicle as claimed in claim 7, wherein said right wheel speed detecting means and said left wheel speed detecting means detect rotational speeds of right and left non-driven wheels respectively.

14. A head lamp device for a vehicle as claimed in claim 8, wherein said right wheel speed detecting means and said left wheel speed detecting means detect rotational speeds of right and left non-driven wheels respectively.

* * * * *

UNITED STATES PATENT AND TRADEMARK OFFICE
CERTIFICATE OF CORRECTION

PATENT NO : 5,876,113
DATED : 02 March 1999
INVENTOR(S): Shinichiro Gotoh

It is certified that error appears in the above-identified patent and that said Letters Patent is hereby corrected as shown below:

On the cover page, under "[30] Foreign Application Priority Data", change "May 9, 1996" to --May 29, 1996--;
under "[57] ABSTRACT", in the 11th line, before "respectively" insert a comma.
Column 1, line numbered between 21 and 22, before "necessary" insert --also--; after "necessary" delete "in addition".
Column 2, lines 4-5, change "means and calculating" to --means, and calculate--.

Signed and Sealed this

Twenty-ninth Day of June, 1999

Attest:

Q. TODD DICKINSON

Attesting Officer

Acting Commissioner of Patents and Trademarks